Patented Dec. 1, 1936

2,062,464

UNITED STATES PATENT OFFICE 2,062,464

ANODES, METHOD OF FORMING THE SAME, AND FORMATION ELECTROLYTE THEREFOR

Julius Edgar Lilienfeld, Winchester, Mass.

No Drawing. Application February 14, 1931, Serial No. 515,884

9 Claims. (Cl. 175—315)

The invention relates to "formed" anodes such as are utilized in electrolytic condensers and rectifiers and result from the polarization of a filming metal; also, to a preliminary treatment of the metal and to the electrolyte in which it is subsequently to be formed.

Anodes are generally formed, as by polarizing a filming metal such as aluminum, tantalum, etc. prior to their use in a condenser or rectifier; and during the formation treatment are subjected to conditions that may be different, both electrically and chemically, from those subsequently met with in operation.

The performance of a condenser depends largely upon the original formation of the anode, for example, with respect to the rate of "come-back" after idling of the condenser as well as with respect to the power factor involved.

I have found that a condenser of relatively low power factor will form up or come-back more rapidly than one having a higher power factor. I have found, moreover, that the nature of the electrolyte in which an anode is initially formed, as well as the nature of the filming metal itself and the preliminary treatment of the same, largely predetermines the qualities of a condenser in which such anode is eventually utilized. For example, a slightly acid and high resistance electrolyte will form a better film or layer than a more nearly neutral or alkaline one; but such electrolytes, made up of a very weak acid, e. g. boric acid without an addition or with a very small addition only of a more alkaline component, e. g. borax, have heretofore not been employed because of their high specific resistance and consequent higher drop of formation voltage in the electrolyte during the formation period. The magnitude of the specific resistance of such electrolytes may be of the order of 300 ohms per cubic centimeter or more, which is some three or more times that of electrolytes as generally utilized for this purpose.

In accordance with the present invention, use is made of such high resistance electrolyte, for example, one of a solution of pure boric acid consisting of preferably 125-170 grams of boric acid per litre. A small amount of borax, from a small fraction of a gram to 5 grams per litre, may, however, be added to the boric acid; and the polarization of an anode, as of aluminum, is best effected under an initial current density of approximately 4 ma. per $cm^2$ up to an applied voltage of from 75-100 volts, although the current density may be appreciably increased. For a short period, the current density is then reduced to less than ½ ma. per $cm^2$, and then increased to 2 ma. per $cm^2$ or more. This current density is substantially maintained and the voltage raised to the peak formation voltage of 600 volts or more, whereupon this peak voltage is kept constant, the current gradually dropping to a negligible value.

Notwithstanding the disadvantage of the high resistance electrolyte and higher formation voltage (a difference of 100 volts or more) required at the formation generator, such an electrolyte has been found to be of decided advantage inasmuch as both power loss in A. C. operation and also power loss and deterioration rate in D. C. operation is considerably smaller with layers formed that way than with layers formed with lower resistance electrolytes. While electrodes formed as hereinbefore noted may be used in an electrolyte of a lower resistance, for example one more alkaline than the formation electrolyte, an electrolyte corresponding to the high resistance formation electrolyte may be utilized with satisfactory results provided the spacing between an anode and cathode remains uniform so as to prevent the narrowing down of the current path and provided the distance does not exceed approximately 6 mm.

The power loss in a condenser utilizing this high resistance electrolyte is then no higher, and in some instances lower, than when utilizing a more conductive electrolyte under similar conditions of electrode spacing. While this may appear paradoxical, it is to be noted that the power loss in an electrolytic condenser is due to two primary components, one being conditioned by the dielectric loss in the layer of film upon the electrode surface and the other by the $I^2R$ loss in the particular electrolyte utilized.

I have found that the loss due to the former is smaller in the electrolytes of higher resistance (more acid), so that the total loss involved may, with minimum spacing of anode and cathode, be less than under conditions involving the use of a lower resistance electrolyte. For example, the power factor of a condenser having an electrolyte composed of a concentrated aqueous solution of boric acid containing 10 grams of borax to the litre of solution, was found to be much higher—even when the path of the current between anode and cathode thereof (plate distance) was rather large, approximately 12 mm.—than when the electrolyte contained only 1 gram to the litre of the concentrated aqueous boric acid solution. With shorter plate distance, the advantage would have been still more striking, so that a minimum power factor should be expected with an electrolyte of even higher resistance. In fact, the use of an electrolyte solely of boric acid without the addition of any borax or only minute proportions thereof is possible, especially if a small amount of an innocuous less electropositive metal like copper, cadmium, nickel, and chromium is introduced into the electrolyte, thus lowering its resistance. An introduction of such metals generally occurs automatically inasmuch as cathodes or containers of Cu or other metals plated with cadmium, nickel and chromium are used so that the electrolyte becomes saturated with the corresponding ions during the operation of the condenser.

Another advantage in using such high resistance electrolytes lies in the fact that the breakdown (sparking) voltage limit of an anode increases considerably with an increase of that resistance, which makes the condenser suitable for operation at higher voltages.

I have found, also, that the formation is dependent on the original condition of the surface of the filming metal composing the anode. This surface is to be absolutely smooth so as to present a highly reflecting appearance and to be also absolutely free of grease.

In the case of aluminum, I have found that an acceptable highly polished finish is presented by rolled sheet aluminum; and that corrosion of the surface during the cleaning process is to be avoided.

The grease-removing solvents heretofore employed were more or less alkaline and tended to roughen the surface with consequent increase in the time required for formation, which results in an increase of the power factor and also in the time of "come-back" of the formed anode. Thus, a corroded surface predetermines a poor quality of the eventual layer formed on the anode metal.

It is advisable to start the cleansing process by first subjecting the anodes to a bath in other and non-alkaline grease solvents such as organic solvents, for example methyl, ethyl or other alcohols, or one of the ethers, benzene, carbon tetrachloride, etc.

It is to be noted that it is possible to carry this preliminary cleansing to the final state and to dispense with the hereinafter described sulfuric acid-bichromate bath for this purpose. However, this may prove to be not quite so economical because it necessitates passing of an anode through a succession of organic solvents that must be maintained in a condition of meticulous cleanliness, unless the anodes be exposed to the vapor of such solvent only. This latter procedure would not be particularly economical due to the expense of the apparatus involved.

I have found, furthermore, that by treating in a second cleaning bath the rolled aluminum sheet, as in a solution both acid and of oxidizing property, the grease may be removed therefrom without roughening its surface. For example, the grease from an aluminum anode may be completely removed by dipping the same for some ten minutes in a bath consisting of a solution of potassium bichromate and concentrated sulfuric acid maintained substantially at room temperature. Again, this second step may be used as the only one (the first step of the use of an organic solvent being dispensed with) except for the fact that the bichromate has a longer life if the anodes are precleaned. The use of such preliminary grease solvents is, therefore, desirable in order to prevent the bath of potassium bichromate and sulfuric acid from becoming too quickly inactive because of accumulating grease. In this connection, it is to be noted that this bath may be regenerated by passing it over a column of potassium bichromate and charcoal, and then filtering it; or fuming sulfuric acid may be added to the contaminated bath.

The surface of an aluminum anode cleansed by the sulfuric acid bichromate bath receives no noticeable oxide coating above that of a non-formed aluminum surface exposed to air; and when formed subsequently in the boric acid high resistance electrolyte, does not lose its smooth polished appearance and lustre, its surface being highly reflecting and its original optical appearance remaining substantially unchanged and differing thus from the anodes as ordinarily formed which have a milky, pasted or frosted appearance.

Insulating layers on aluminum can be formed by different processes, and in the present instance the formation is limited to an electrochemical process. Such electrochemical formation process is, moreover, vastly different inasmuch as a large variety of electrolytes may be used and inasmuch as the voltage range up to which a layer may be formed is quite wide.

As hereinbefore set forth, the present application limits itself to the case of oxide forming electrolytes as of the character of borax and boric acid, although salicylic acid and salicylates are another example of electrolyte forming ionogens of this character.

Layers resulting from the formation with such electrolytes may, furthermore, be quite different depending upon the concentration of the components—borax and boric acid— of the electrolyte, and also in accordance with the voltage up to which the polarization is carried, the current density at the anode and the temperature of the electrolyte. The character of the film or layer depends, also, upon the condition of the aluminum surface previous to the formation. Naturally, the purity of the aluminum also enters as a factor, as well as the more or less smooth appearance of the surface and in addition the fact as to whether or not the aluminum surface has been cleaned prior to the forming operation.

The electrical behavior of the various layers which may be formed, and particularly their behavior as condenser elements, is of especial importance as power loss in these layers, when operated on A. C., is an important commercial consideration and should be as low as possible. The rate of deterioration of an idling anode is another important factor, particularly when the condenser is utilized in filter circuits, being operated under these conditions intermittently and wherein it is desirable to have the deterioration as low as possible and the anode to come back as fast as possible after idling. I have found that both of these features, deterioration and power loss, appear to be interrelated, and that invariably a low power loss layer deteriorates but slightly, as vice versa.

The chemical reason for different electrical behavior of different oxide layers I ascribe to a property which I term "hydratability". The layers formed, as indicated hereinbefore, consist of hydrated aluminum oxides, and the difference between them is mainly due to the degree to which they are hydrated. This degree of hydration for a given layer depends upon the water pressure in the surrounding atmosphere, the hydration over a drying agent being very much lower—it would be zero if the drying agent were perfect—than the hydration in air, and this in turn is lower than the hydration in contact with saturated water vapor.

Two identical layers will contain the same amount of hydrated molecules at the same water pressure in a surrounding atmosphere, while two different layers will contain different amounts of hydrated molecules under the same conditions. The one that under given conditions contains more hydrated molecules I term the layer with a higher hydratability, and the one that contains less hydrated molecules the layer with the lower hydratability.

Capacity and power loss of a condenser depend, I have determined, upon the number of hydrated molecules in the layer. Both of these factors decrease as the number of hydrated molecules decrease. Hence the electrically best layer—the lowest power loss layer—is the layer of the lowest hydratability.

One method of testing the hydratability of a layer is to test the layer outside of the electrolyte in an atmosphere provided with different water pressures. Layers of low hydratability will then show a comparatively small variation of the capacity and power loss whether they are tested over a drying agent or in a damp atmosphere. Layers with a high hydratability on the contrary will show a very large difference of capacity and power loss under these conditions.

Layers with the lowest hydratability and, therefore, with the most desirable electrical characteristics, will have a power loss, I have found, of not more than 4 to 5%, and in the best cases of about 2% only. They will also be optically distinguishable in that the lower power loss layer, after formation, does not appreciably detract from the highly reflecting quality of the aluminum as it was before the formation, thus serving as a means of distinguishing a low hydratable, electrically highly efficient layer from layers of the nature resulting from formation as heretofore conducted.

Another way of distinguishing the novel, highly efficient layer from an inefficient one is to dissolve in diluted hydrochloric acid the aluminum on which the layers are formed. The efficient layers are left floating in the hydrochloric acid as extremely thin and transparent scale-like flakes showing interference colors and slightly curved, while the inefficient layers are translucent and have a milky appearance similar to coagulated casein of milk.

The hydratability of a layer depends also upon peak formation voltage—the higher this peak, the lower the hydratability. Current density is also somewhat of a factor, a too low current density favoring an increase in hydratability.

It depends, furthermore, upon the electrolyte; in case of boric-acid-borax, the more acid and less borax containing an electrolyte utilized, the lower the hydratability. In fact, broadly, an increase of OH concentration increases hydratability. The temperature applied during the formation process is of importance in that for low hydratability layers, no temperature less than 60° C. should be used; and the temperature may be carried up to the boiling point. Furthermore, the pH value of the forming electrolyte at such elevated temperatures is quite different from the value at room temperatures; also, it possesses a considerably lower resistance when thus heated in view of the greater dissociation of a weak acid when heated.

I claim:
1. The method of forming electrodes of a filming metal, which comprises polarizing the same in an electrolyte consisting solely of an aqueous solution of pure boric acid.

2. The method of forming electrodes of a filming metal, which comprises polarizing the same in an electrolyte consisting solely of an aqueous solution of pure boric acid under an initial current density of not less than 4 ma. per $cm^2$ and an applied voltage up to 75–100 volts, then reducing for a short period the current density, then maintaining the current density at a higher value but below its initial amount and with increase of the voltage to at least 600 volts, and maintaining substantially constant this voltage during the gradual reduction of the current to a negligible value.

3. The method of forming an aluminum anode, which includes the step of treating the same with a solution of potassium bichromate in concentrated sulfuric acid to remove grease therefrom without roughening of the aluminum surface, and then forming the anode in an electrolyte consisting solely of an aqueous solution of pure boric acid whereby the formed anode will possess a smooth polished surface.

4. A high resistance forming electrolyte for anodes consisting solely of a solution of pure boric acid in water at a temperature in excess of 60° C.

5. The method of forming electrodes of a filming metal, which includes polarizing the same in a forming acid electrolyte at an elevated temperature, and comprising an aqueous solution of between 125 and 170 grams of boric acid per liter of the electrolyte.

6. The method of forming electrodes of a filming metal, which comprises polarizing the same at an elevated temperature in a forming electrolyte consisting solely of an aqueous solution of pure boric acid.

7. A high resistance forming electrolyte for anodes, consisting of an aqueous solution of pure boric acid at an elevated temperature and having at that temperature a pH value substantially less than 6.8.

8. A high resistance forming electrolyte for anodes, containing boric acid in aqueous solution in excess of the amount soluble therein at room temperature.

9. The method of forming electrodes of a filming metal, which includes polarizing the same in a forming acid electrolyte comprising an aqueous solution of boric acid at a temperature in excess of 60° C. and having a specific resistance at this temperature of the order of at least 300 ohms per ccm. of the electrolyte.

JULIUS EDGAR LILIENFELD.